(12) United States Patent
Chan

(10) Patent No.: US 7,535,643 B1
(45) Date of Patent: May 19, 2009

(54) FOLDING MIRROR

(75) Inventor: Po-Wen Chan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/967,007

(22) Filed: Dec. 29, 2007

(30) Foreign Application Priority Data

Nov. 27, 2007 (CN) .................. 2007 1 0202713

(51) Int. Cl.
G02B 1/10 (2006.01)
F21V 9/04 (2006.01)
(52) U.S. Cl. .................. 359/588; 359/359; 359/584
(58) Field of Classification Search ......... 359/350–361, 359/577–590
See application file for complete search history.

(56) References Cited

U.S. PATENT DOCUMENTS

| | | | | |
|---|---|---|---|---|
| 5,926,317 A | * | 7/1999 | Cushing | .................. 359/588 |
| 7,012,747 B2 | * | 3/2006 | Kagawa et al. | .............. 359/487 |
| 7,165,846 B2 | | 1/2007 | Sannohe | |
| 7,212,336 B2 | * | 5/2007 | Chen et al. | .................. 359/359 |
| 7,227,691 B2 | * | 6/2007 | Kamikawa | .................. 359/588 |

* cited by examiner

*Primary Examiner*—Thong Nguyen
(74) *Attorney, Agent, or Firm*—Zhigang Ma

(57) ABSTRACT

A folding mirror includes a substrate and a dielectric multilayered film formed on a surface of the substrate. The dielectric multilayered film includes a first period layer with a structure represented by a formula $(0.58H1.16L0.58H)^{N1}$, a second period layer with a structure represented by a formula $(0.8L1.6H0.8L)^{N2}$, and a third period layer with a structure represented by a formula $(0.95L1.9H0.95L)^{N3}$, wherein, H represents a thickness of a high refractive index layer being set at ¼ of a reference wavelength associated with the film, and L represents a thickness of a low refractive index layer being set at ¼ of a reference wavelength associated with the film, all of the N1, N2, and N3 represent the numbers of repetitions of the structures, enclosed by the corresponding parentheses, forming the first period layer, the second period layer, and the third period layer respectively.

16 Claims, 2 Drawing Sheets

FOLDING MIRROR

TECHNICAL FIELD

The present invention relates to a folding mirror, particularly, to a folding mirror used for a pick-up head of an optical recording/reproducing device.

DESCRIPTION OF RELATED ART

Generally speaking, an optical recording/reproducing device can use a optical disc, such as a compact disc (CD), a digital versatile disc (DVD), or a high definition digital versatile disc (HD-DVD) to record a large amount of data therein, and can reproduce data stored in the optical disc.

The wavelength of the lights used for reading CDs, DVDs, and HD-DVDs are 785 nm, 660 nm, and 405 nm respectively. Therefore, the folding mirrors used for reflecting the lights used for reading CDs, DVDs, and HD-DVDs need be designed with different reflection films. Further more, because the light transmitted in the optical recording/reproducing device isn't parallel light, it is demanded that the reflectance of the film of the folding mirror not vary too much with variations of incident angles of the incident light.

What is needed, therefore, is a folding mirror that can be used for reflecting the lights for reading CDs, DVDs, and HD-DVDs and reflectance thereof has small change compared to the incident angle of the incident light.

SUMMARY

In accordance with one present embodiment, a folding mirror includes a substrate and a dielectric multilayered film formed on a surface of the substrate. The dielectric multilayered film includes a first period layer with a structure represented by a formula $(0.5H1.16L0.58H)^{N1}$, a second period layer with a structure represented by a formula $(0.8L1.6H0.8L)^{N2}$, and a third period layer with a structure represented by a formula $(0.95L1.9H0.95L)^{N3}$, wherein, H represents a thickness of a high refractive index layer being set at ¼ of a reference wavelength associated with the film, and L represents a thickness of a low refractive index layer being set at ¼ of a reference wavelength associated with the film, N1, N2, and N3 represent the numbers of repetitions of the structures, enclosed by the corresponding parentheses, forming the first period layer, the second period layer, and the third period layer respectively.

BRIEF DESCRIPTION OF THE DRAWING

Many aspects of the present folding mirror can be better understood with reference to the following drawings. The components in the drawing are not necessarily drawn to scale, the emphasis instead being placed upon clearly illustrating the principles of the present folding mirror.

DETAILED DESCRIPTION OF THE EMBODIMENTS

Embodiments of the present invention will now be described in detail below, with reference to the drawings.

Figure 1:
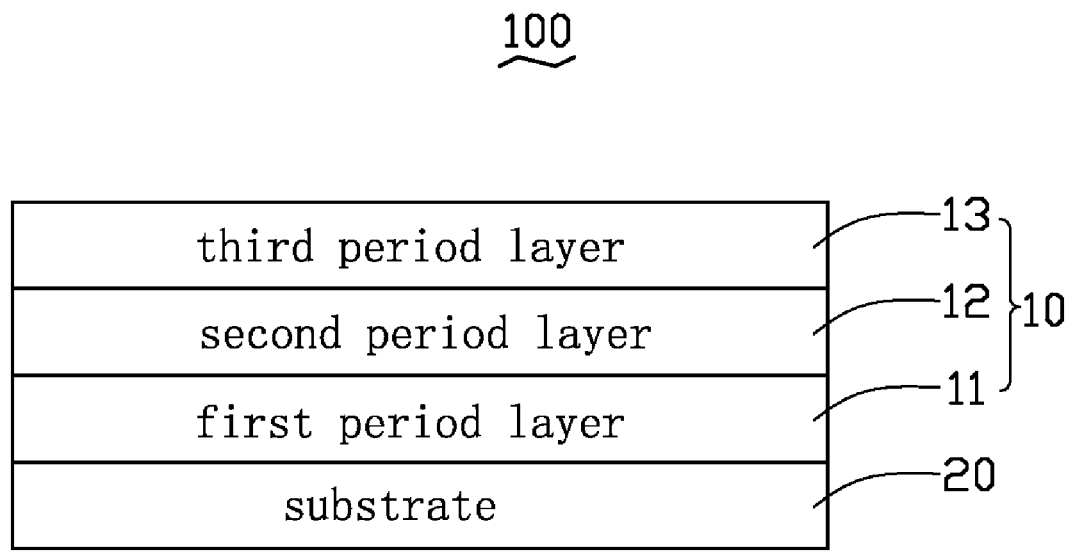
FIG. 1 is a schematic view of a folding mirror according to a present embodiment of the present invention.

Referring to FIG. 1, a folding mirror 100, according to an embodiment, is shown. The folding mirror 100 includes a substrate 20 and a dielectric multilayered film 10 formed on a surface of the substrate 20. The material of the substrate 20 can be selected from glass or plastic.

The dielectric multilayered film 10 includes a first period layer 11, a second period layer 12, and a third period layer 13. Each of the first period layer 11, the second period layer 12, and the third period layer 13 includes alternately formed high refractive index layers and low refractive index layers.

The structure of the first period layer 11 is represented by a formula $(0.58H1.16L0.58H)^{N1}$. The structure of the second period layer 12 is represented by a formula $(0.8L1.6H0.8L)^{N2}$. The structure of the third period layer 13 is represented by a formula $(0.95L1.9H0.95L)^{N3}$. Wherein H represents a thickness of a high refractive index layer being set at ¼ of a reference wavelength associated with the film, and L represents a thickness of a low refractive index layer being set at ¼ of a reference wavelength associated with the film, N1, N2, and N3 represent the numbers of repetitions of the structure, enclosed by the corresponding parentheses. The reference wavelength is in a range from 420 nm to 470 nm. Preferably, the reference wavelength is 450 nm. N1, N2, and N3 are integers, and we prefer the values of N1, N2, and N3 to be in a range from 2 to 6.

In the present embodiment, the first period layer 11 is used for controlling the reflectance of the folding mirror 100 exposed to a wavelength of 405 nm. The second period layer 12 is used for controlling the reflectance of the folding mirror 100 exposed to a wavelength of 660 nm. The third period layer 13 is used for controlling the reflectance of the folding mirror 100 exposed to a wavelength of 785 nm. So that, the order in which the first period layer 11, the second period layer 12, and the third period layer 13 are applied to the dielectric multilayered film 10 is interchangeable without effect.

In the present embodiment, a material with refractive index in a range from 1.4 to 1.5 is used as the low refractive index material. The low refractive index material can be selected from a group consisting of $MgF_2$ and $SiO_2$. A material with refractive index in a range from 2.0 to 2.3 is used as the high refractive index material. The high refractive index material can be selected from a group consisting of $TiO_2$, $Ta_2O_5$, and $Nb_2O_5$.

An example of the folding mirror 100 will be described below with reference to FIG. 2. It is to be understood that the invention is not limited to this example.

The structure of dielectric multilayered film 10 of the folding mirror 100 according to an exemplary example is represented by a formula $(0.58H1.16L0.58H)^2 (0.8L1.6H0.8L)^4 (0.95L1.9H0.95L)^4$. Wherein, the refractive index of the low refractive index material is 1.468, the refractive index of the high refractive index material is 2.215, the low refractive index material is $SiO_2$, the high refractive index material is $Ta_2O_5$, and the reference wavelength is 450 nm.

Figure 2:
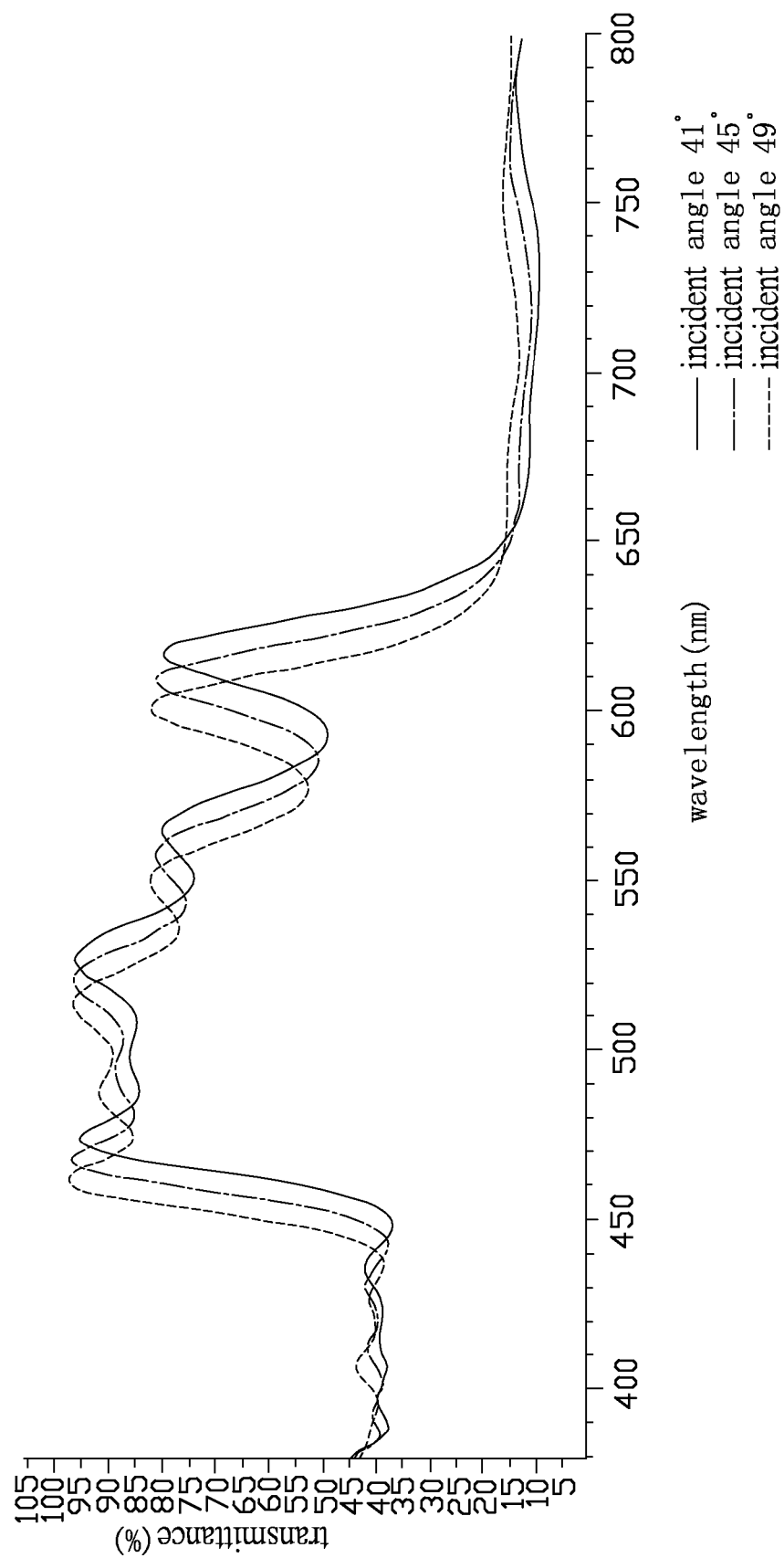
FIG. 2 is a graph showing transmittance characteristics of a folding mirror according to an exemplary embodiment of the present invention.

Referring to FIG. 2, a graph shows transmittance characteristics of the folding mirror 100 according to the exemplary example corresponding to incident lights with incident angles of 41°, 45°, and 49°. The abscissa of the graph represents wavelengths and the ordinate of the graph represents transmittance. From the FIG. 2, we can see that the transmittance characteristics of the folding mirror 100 corresponding to incident lights with incident angles of 41°, 45°, and 49° are essentially the same as each other. The transmittance of the folding mirror 100 exposed to wavelengths of 405 nm, 660 nm, and 785 nm are relatively lower than at other wavelengths. So that, most of the light with wavelengths of 405 nm, 660 nm, and 785 nm can be used by optical recording/reproducing devices. Accordingly, the folding mirror 100 can be used for reflecting light for reading CDs, DVDs, and HD-DVDs.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A folding mirror comprising:
   a substrate; and
   a dielectric multilayered film formed on a surface of the substrate, the dielectric multilayered film comprising:
   a first period layer with a structure represented by a formula $(0.58H1.16L0.58H)^{N1}$;
   a second period layer with a structure represented by a formula $(0.8L1.6H0.8L)^{N2}$; and
   a third period layer with a structure represented by a formula $(0.95L1.9H0.95L)^{N3}$,
   wherein, H represents a thickness of a high refractive index layer being set at ¼ of a reference wavelength associated with the film, and L represents a thickness of a low refractive index layer being set at ¼ of a reference wavelength associated with the film, N1, N2, and N3 represent the numbers of repetitions of the structures, enclosed by the corresponding parentheses.

2. The folding mirror as claimed in claim 1, wherein the reference wavelength is in a range from 420 nm to 470 nm.

3. The folding mirror as claimed in claim 2, wherein the reference wavelength is 450 nm.

4. The folding mirror as claimed in claim 1, wherein the values of N1, N2, and N3 are in a range from 2 to 6.

5. The folding mirror as claimed in claim 1, wherein the refractive index of the high refractive index material is in a range from 2.0 to 2.3.

6. The folding mirror as claimed in claim 1, wherein the high refractive index material is comprised of a material selected from a group consisting of $TiO_2$, $Ta_2O_5$, and $Nb_2O_5$.

7. The folding mirror as claimed in claim 1, wherein the refractive index of the low refractive index material is in a range from 1.4 to 1.5.

8. The folding mirror as claimed in claim 1, wherein the low refractive index material is comprised of a material selected from a group consisting of $MgF_2$ and $SiO_2$.

9. A dielectric multilayered film comprising:
   a first period layer with a structure represented by a formula $(0.58H1.16L0.58H)^{N1}$;
   a second period layer with a structure represented by a formula $(0.8L1.6H0.8L)^{N2}$; and
   a third period layer with a structure represented by a formula $(0.95L1.9H0.95L)^{N3}$,
   wherein, H represents a thickness of a high refractive index layer being set at ¼ of a reference wavelength associated with the film, and L represents a thickness of a low refractive index layer being set at ¼ of a reference wavelength associated with the film, N1, N2, and N3 represent the numbers of repetitions of the structures, enclosed by the corresponding parentheses.

10. The dielectric multilayered film as claimed in claim 9, wherein the reference wavelength is in a range from 420 nm to 470 nm.

11. The dielectric multilayered film as claimed in claim 10, wherein the reference wavelength is 450 nm.

12. The dielectric multilayered film as claimed in claim 9, wherein the values of N1, N2, and N3 are in a range from 2 to 6.

13. The dielectric multilayered film as claimed in claim 9, wherein the refractive index of the high refractive index material is in a range from 2.0 to 2.3.

14. The dielectric multilayered film as claimed in claim 9, wherein the high refractive index material is comprised of a material selected from a group consisting of $TiO_2$, $Ta_2O_5$, and $Nb_2O_5$.

15. The dielectric multilayered film as claimed in claim 9, wherein the refractive index of the low refractive index material is in a range from 1.4 to 1.5.

16. The dielectric multilayered film as claimed in claim 9, wherein the low refractive index material is comprised of a material selected from a group consisting of MgF2 and SiO2.

* * * * *